United States Patent [19]

Ruehle

[11] 4,298,966
[45] Nov. 3, 1981

[54] REMOVAL OF SURFACE LAYER ANOMALY EFFECTS

[75] Inventor: William H. Ruehle, Duncanville, Tex.

[73] Assignee: Mobil Oil Corporation, New York, N.Y.

[21] Appl. No.: 5,652

[22] Filed: Jan. 22, 1979

[51] Int. Cl.³ ............................................. G01V 1/32
[52] U.S. Cl. ........................................ 367/50; 367/74
[58] Field of Search ....................... 367/50, 51, 73, 74

[56] References Cited

U.S. PATENT DOCUMENTS

| | | | |
|---|---|---|---|
| 3,668,618 | 6/1972 | Quay | 367/74 |
| 3,671,929 | 6/1972 | Ruehle et al. | 367/74 |
| 3,864,667 | 2/1975 | Bahjat | 367/48 |
| 3,940,734 | 2/1976 | Blum | 367/50 |

OTHER PUBLICATIONS

"Long Wavelength Static Estimation Geophysics", Booker et al., *Geophysics*, vol. 41, No. 5, Oct. 76, pp. 939-959.

*Primary Examiner*—Howard A. Birmiel
*Attorney, Agent, or Firm*—George W. Hager; Michael G. Gilman; Charles A. Huggett

[57] ABSTRACT

In marine seismic exploration, the distortion introduced by an anomalous surface layer is removed from seismograms. The surface layer travel time, obtained for example from fathometer readings, is converted to a model depth section of the anomalous surface layer. Another model depth section includes an assigned control layer without the anomaly. From these two depth sections, time corrections are obtained. These time corrections are applied to the seismograms at the time of reflection from each of the subsurface interfaces.

8 Claims, 13 Drawing Figures

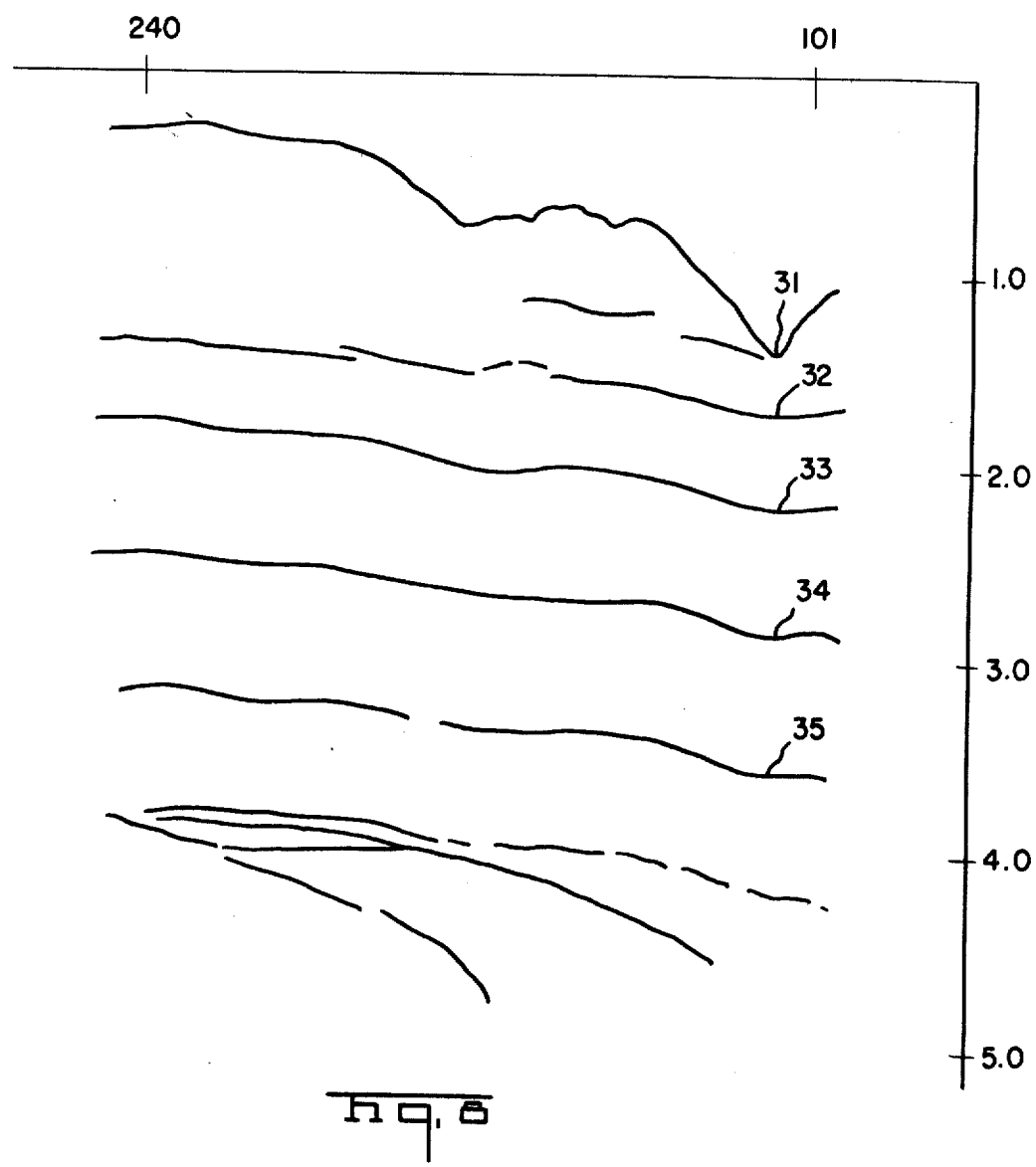

REMOVAL OF SURFACE LAYER ANOMALY EFFECTS

BACKGROUND OF THE INVENTION

This invention relates to seismic exploration and more particularly to the removal of distortion produced by surface layer anomalies.

In seismic exploration, seismic energy from a source is reflected from subsurface layers and detected to produce seismograms which represent the subsurface layering. One type of seismic exploration which is particularly prevalent is referred to as common depth point (CDP) exploration. Seismograms produced in this manner are particularly useful because they can be stacked, or composited, to enhance the signal to noise ratio. Before stacking, it is necessary to normal move-out correct seismic traces. In order to do this, it is necessary to determine the velocity of the subsurface layers. The velocity used to normal move-out correct the traces before stacking is often referred to as the "stacking velocity".

Determination of the correct stacking velocity is described, for example, in "SEISMIC VELOCITIES FROM SUBSURFACE MEASUREMENTS", C. H. Dix, GEOPHYSICS, Vol. 20, pages 868-886, 1955.

Prior to stacking, groups of seismic traces beyond a certain source receiver offset distance and having a record times less than a minimum time are muted or nulled. This operation eliminates noise, refractions and nonlinear distortion from the resulting summed output. This muting of the seismic common depth point records also determines the effective spread length and trace distribution with distance. However, it results in a variable number of traces with time, and this introduces time variant distortions in the resulting summed set of seismic traces representing the stacked cross section. One particularly troublesome time variant distortion results from surface layer velocity gradients or thickness changes. This problem is discussed in Lucas, A. L. et al., "The Calculations Of Laterally Varying Time Delays From Stacking Velocity Anomalies" SEG, October 1975; Booker, A. H. et al, "Long Wavelength Static Estimation" SEG, October 1975; and Booker, A. H. et al, "Long Wavelength Static Estimation Geophysics", 41, No. 5, pp. 939-959. An example of a surface layer anomaly which produces time variant distortion is a depression in the ocean bottom. The stacking velocity, as determined from the seismograms, is distorted by this change in the depth of the water layer. Similarly, a change in the velocity characteristics of a uniform surface layer distorts the stacking velocity in land exploration. Other layer anomalies introduce such distortion. These include irregular surface elevation along the seismic profile, layer anomalies due to thickness or velocity, and changes where the layer occurs at any level in the section. This distortion is particularly difficult to remove because it changes with record time, i.e., it is time variant. It is not possible to introduce a static time shift into the seismograms which will correct this type of distortion. The time distortion diminishes with record time, but it also spreads horizontally across a field section with record time. Therefore, it is necessary to determine the time correction for all record times and for all horizontal distances from the shot point.

The present invention is directed to a method which can be used to successfully correct seismograms for the distortion introduced by anomalous layers.

SUMMARY OF THE INVENTION

In accordance with the present invention, distortion introduced by layer anomalies is removed from seismograms by a technique which includes generating a seismic depth section having the anomaly, and generating another seismic section which does not have the anomaly. From these depth sections, records are produced of the reflections to the various subsurfaces. The differences between these reflections are a set of time corrections. These time corrections are determined for each trace of the seismograms and for each subsurface. These time corrections are applied to the seismograms at the correct record times to remove distortion in a time variant manner.

The foregoing and other objects, features and advantages of the invention will be better understood from the following more detailed description and appended claims.

DESCRIPTION OF THE DRAWINGS

FIG. 3 depicts a model depth section with a surface layer thickness anomaly and ray paths to reflecting subsurfaces;

FIg. 3A shows a model seismic trace obtained from the depth section of FIG. 3;

FIG. 8 shows the reflections from subsurfaces on a CDP stacked seismic section which has not been corrected for time variant distortion; and FIG. 9 depicts the reflections from subsurfaces on the same CDP stacked seismic section which has been corrected in accordance with the present invention.

DESCRIPTION OF THE PREFERRED EMBODIMENT

Figure 1:
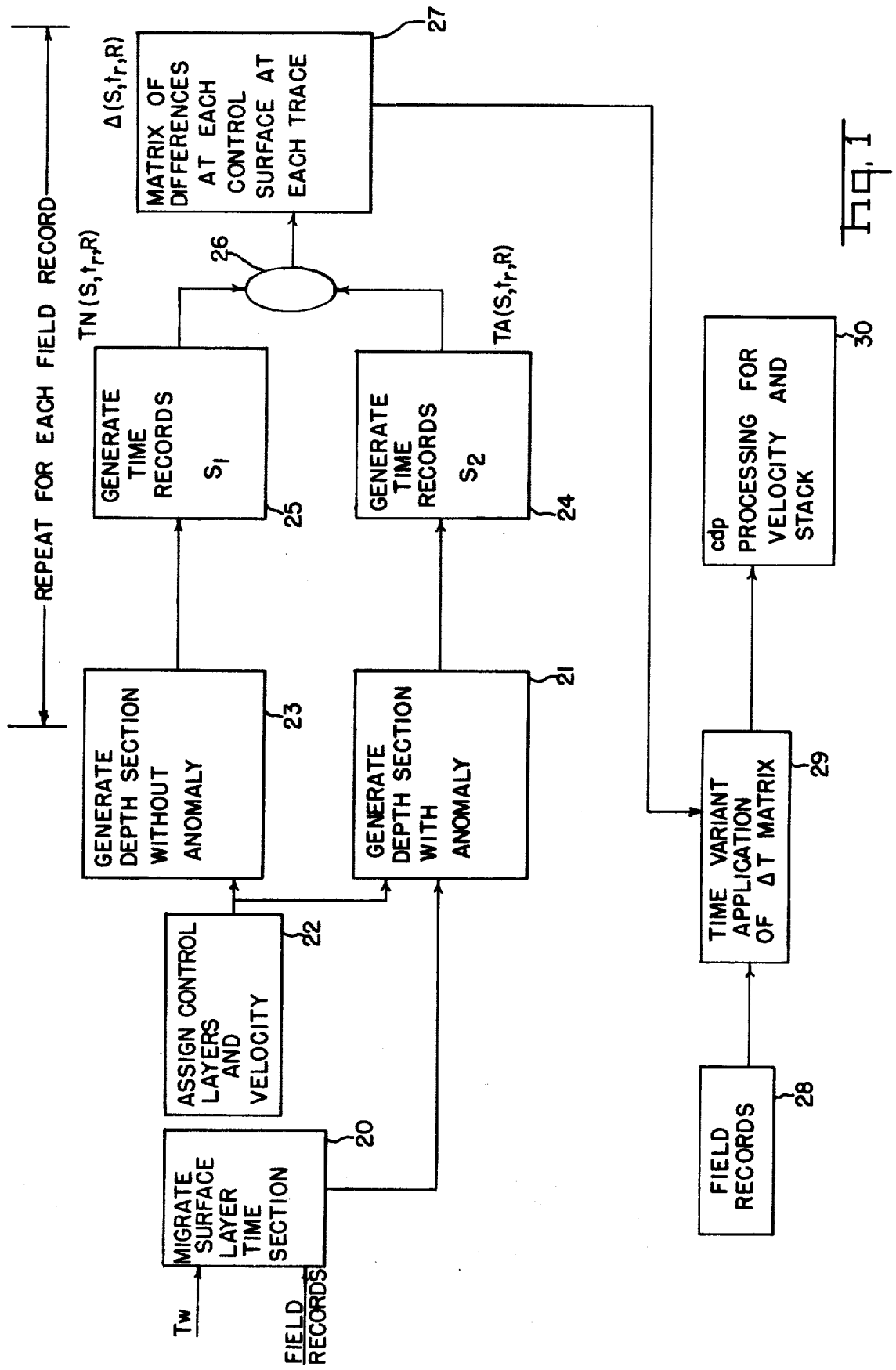
FIG. 1 depicts the distortion removal process of this invention.

Before describing the invention as depicted in FIG. 1, the problem of distortion introduced by an anomalous layer will be discussed.

Figure 2A:
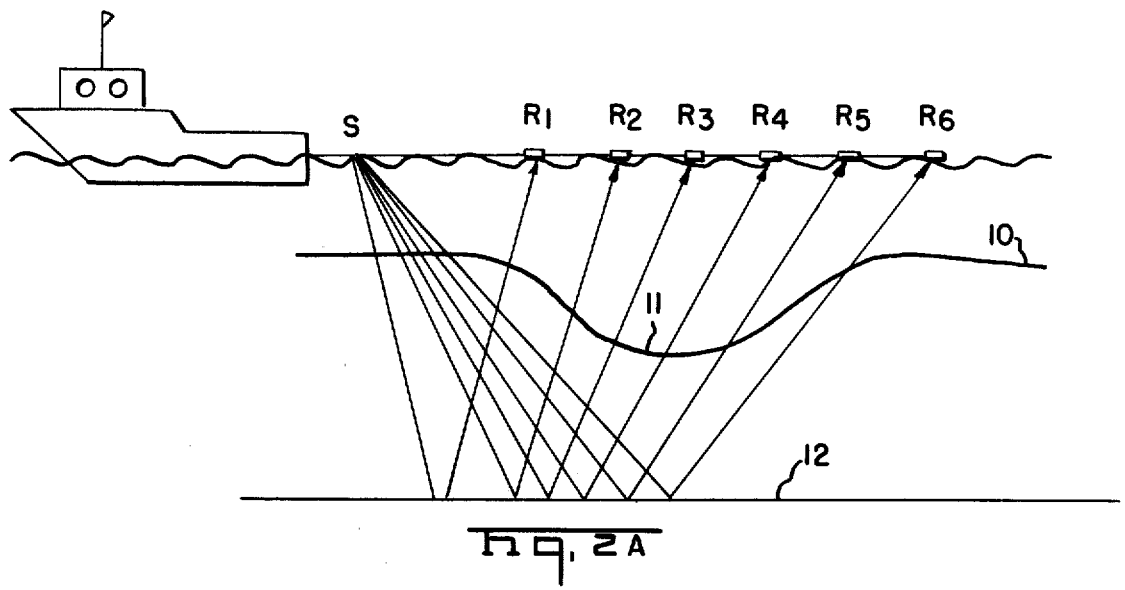
FIG. 2A depicts a seismic field system recording over a surface layer thickness anomaly.

FIG. 2A depicts a typical marine seismic exploration system which has a source S and receivers $R_1$, $R_2$ ... $R_6$ which are towed along a line of exploration. The water bottom 10 has an anomaly which is the depression 11. This depression causes time differences in the times of reflections from subsurface interface 12 as detected at the different receivers.

Figure 2B:
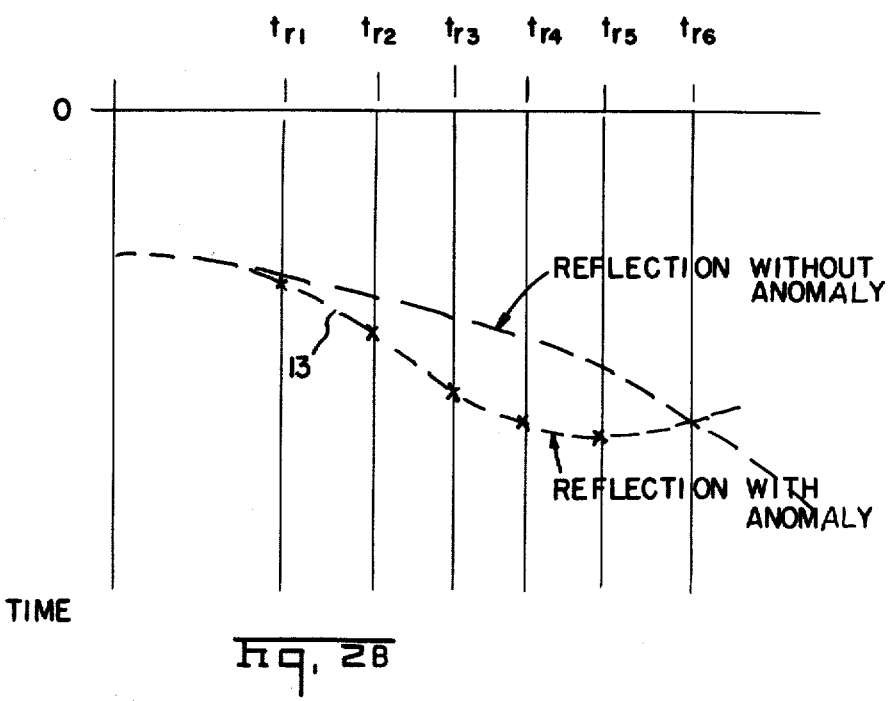
FIG. 2B depicts seismograms from a reflecting subsurface below the surface layer with and without the thickness anomaly of FIG. 2A.

FIG. 2B shows the traces $t_{r1}, t_{r2} \ldots t_{r6}$ obtained from receivers $R_1, R_2 \ldots R_6$ respectively. The line 13 is drawn through the reflections from the interface 12. Because of the anomaly which introduces a longer path through the lower velocity water, the reflections occur at a later time than they would if the anomaly were not present.

FIG. 3 depicts the ray paths from the source S to the receiver $R_4$ for each of the reflecting interfaces 10, 12, 14 and 15.

FIG. 3A depicts the reflections from each of these interfaces. The reflection 16 has a time error $\Delta_1$ introduced by the anomalous depression 11. Reflection 17 has a time error $\Delta_2$, reflection 18 has a time error $\Delta_3$ and reflection 19 has a time error $\Delta_4$. The time error introduced by a surface layer thickness anomaly is time variant; that is, it may increase or decrease with record time. Also, the error spreads across a field section with increasing record time. While the error is most pronounced directly beneath the anomaly at small record times, it spreads across a greater horizontal offset at longer record times. This makes correction of the error difficult, but the present invention can be successfully used to correct for this error.

Figure 4A:
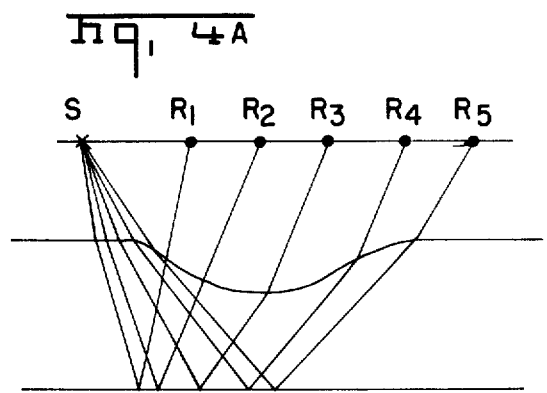
FIG. 4A shows a depth section of a surface anomaly.

Referring to FIG. 1, the time section of the surface layer of the field seismogram is migrated by conventional techniques as indicated at 20. The migrated time section is converted into a depth section as indicated at 21. This produces the depth section of the surface and subsurface layers as shown in FIG. 4A. Steps 20 and 21 may be carried out in accordance with the procedure described in Ruehle et al, U.S. Pat. No. 3,671,929. The output of step 4a in that patent is a depth section similar to that shown in FIG. 4A herein. The input used to produce this time section includes the field records and the water bottom time $T_w$. Water bottom time can be obtained from fathometer readings from marine records. For land records, the travel time through the weathered surface layer is conventionally given in the header of each field record. The migration procedure determines true depth and horizontal offset for each shot point. Then, the depth between the migrated shot points is interpolated to obtain the true depth for each CDP set.

Figure 5A:
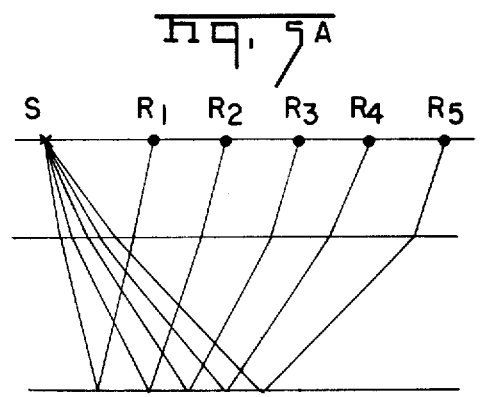
FIG. 5A is a depth section of a desired surface layer without the anomaly.

Another depth section is produced in a similar manner as indicated by the steps 22 and 23. In this case, a control layer without the anomaly is assigned to the procedure. Also, the operator assigns velocity. In marine exploration, this will be water velocity, but in land exploration, various velocities may be assigned to produce a depth section of a surface layer without anomalies. The output of these steps is shown in FIG. 5A. Again, steps 22 and 23 are implemented with the procedure of steps 1a through 4a in the aforementioned Ruehle et al patent. The computergraphic techniques described in that patent can be used to assign the control layers and velocity which are necessary to produce the depth section of the desired surface layer.

Figure 4B:
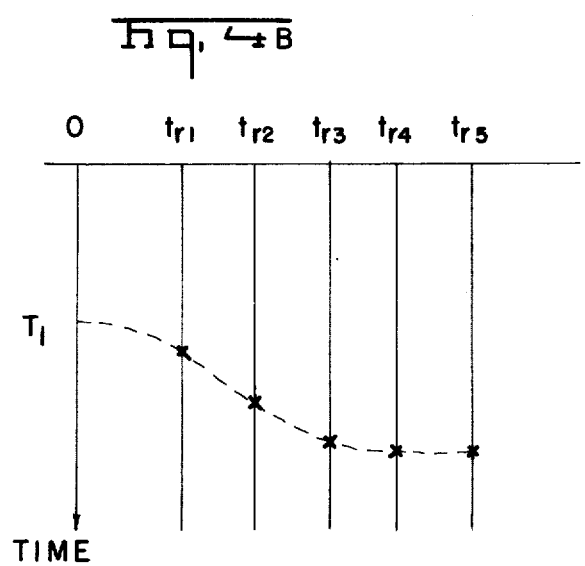
FIG. 4B is a seismogram of the reflections beneath the anomalous surface layer of FIG. 4A.
Figure 5B:
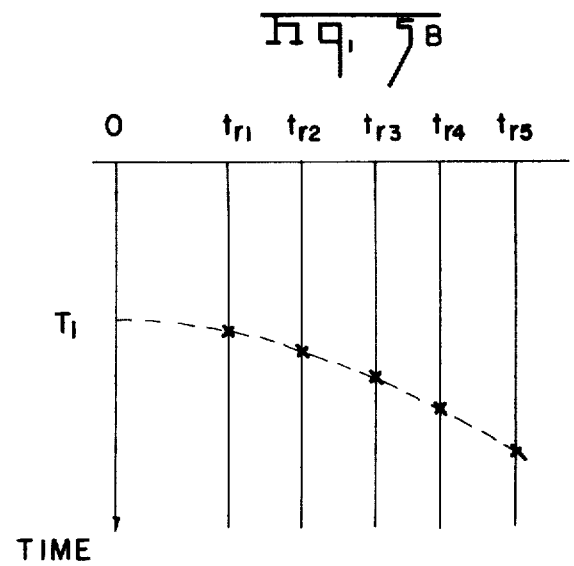
FIG. 5B is a seismogram of reflections beneath the desired surface layer of FIG. 5A.
Figure 6:
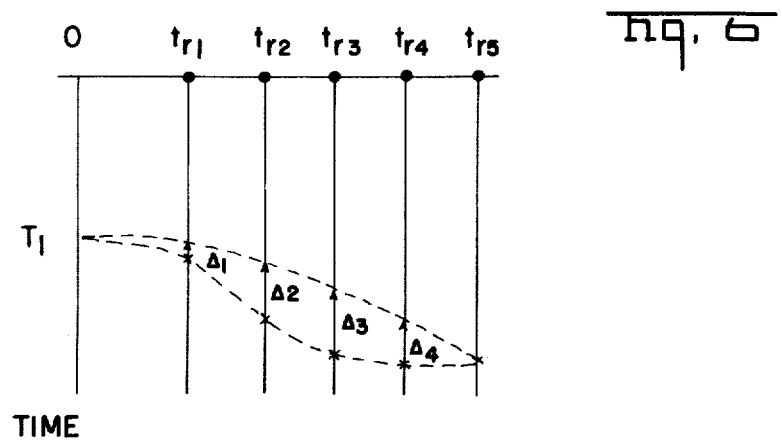
FIG. 6 shows corrections applied to field traces of a seismogram whose source and receiver locations are positioned over the field anomaly.
Figure 7:
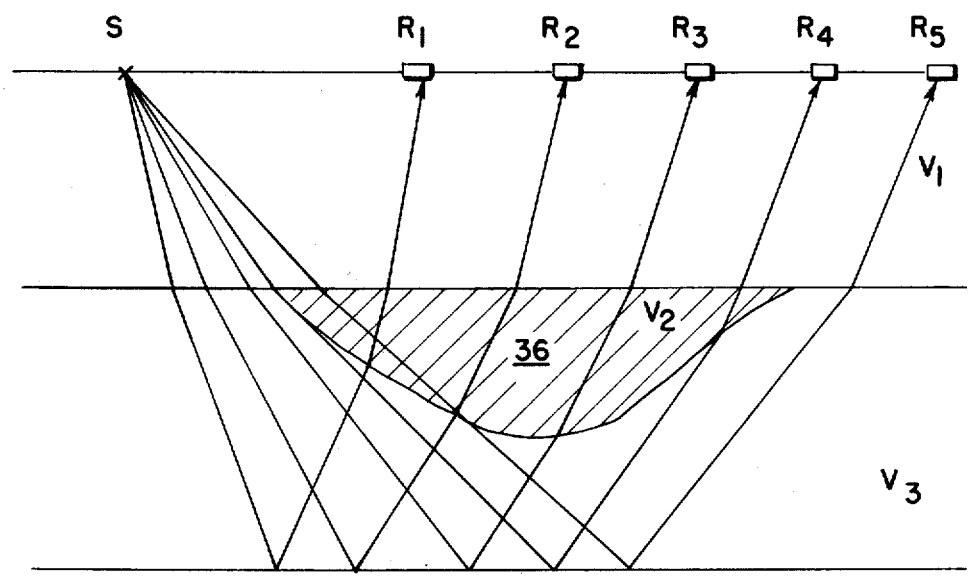
Figure 7:
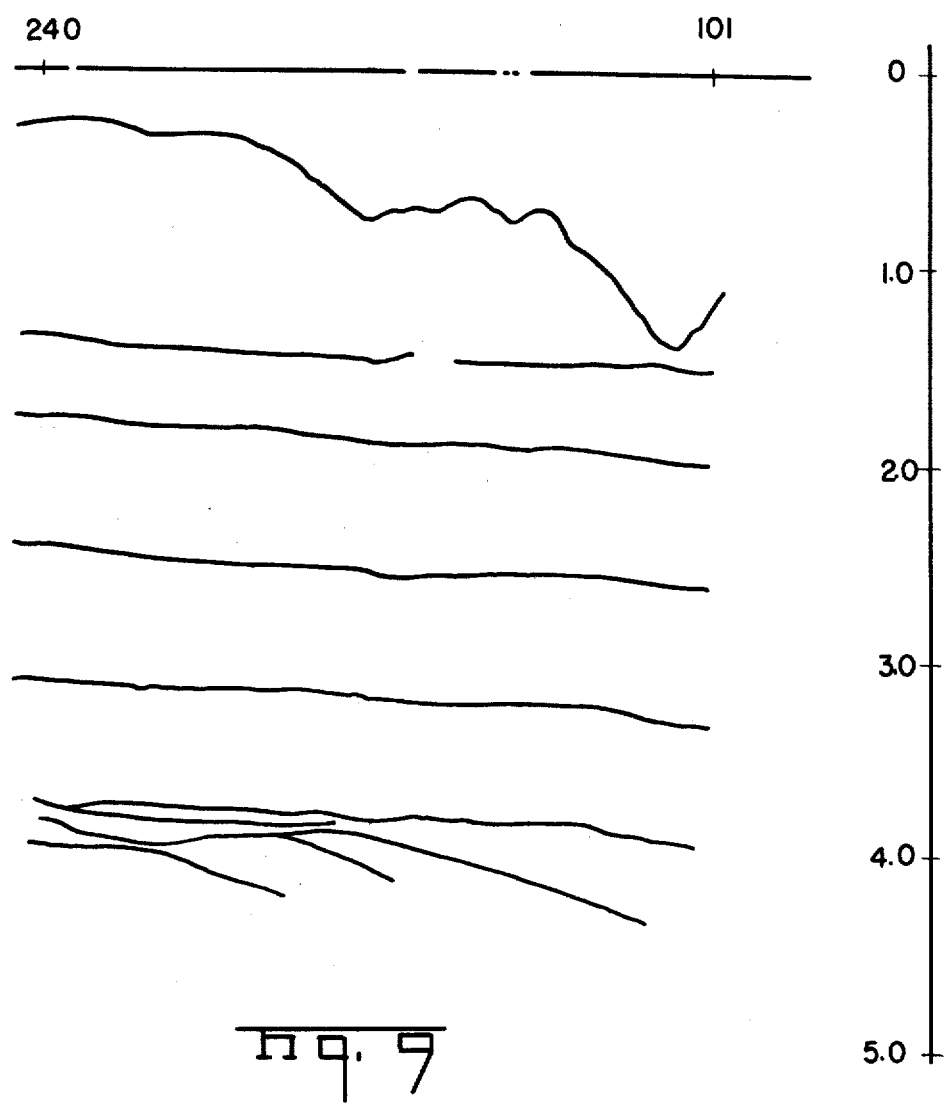

The depth sections of FIGS. 4A and 5A are converted to the time sections shown in FIGS. 4B and 5B respectively. This is indicated by the steps 24 and 25 in FIG. 1. Again, the procedure described in the aforementioned Ruehle et al patent can be used to generate these time sections. Step 7a in that patent generates a digital time section of reflections. A digital time section of reflections beneath an anomalous surface layer is combined with a digital time section of reflections beneath a desired surface layer to obtain the differences in reflection times. This step is indicated at 26 in FIG. 1. The result is an array of time corrections $\Delta_1, \Delta_2, \Delta_3$, and so on, one for each trace. These time corrections are depicted in FIG. 6. They are the differences between the times of reflections of FIGS. 4B and 5B. Similar corrections are obtained for every record time and for every seismic field record. These are stored as indicated at 27 in FIG. 1. The difference matrix includes the time correction and the record time of the reflection to which it applies for each trace of each field record.

The field records, indicated at 28, are time corrected as indicated at 29. Conventional digital time shifting techniques can be used. Conventional CDP processing can then be applied to the time corrected field records as indicated at 30. This processing includes a determination of stacking velocity, normal moveout correction, and stacking.

The effectiveness of the present invention can be seen by comparing FIGS. 8 and 9. FIG. 8 shows the reflections on a field record before the time corrections of the present invention were applied. The anomalous depression 31 in the surface layer results in time anomalies 32-35 in reflections as deep as 3.5 seconds record time. Some anomalous subsurface layering is normally associated with a surface anomaly such as this, but the marked anomalies 32-35 are clearly erroneous. FIG. 9 depicts reflections on the same field record after the corrections of this invention have been applied. The field record now more clearly depicts reflection time and can be used to make a true determination of stacking velocity.

Figures 7, 7A:
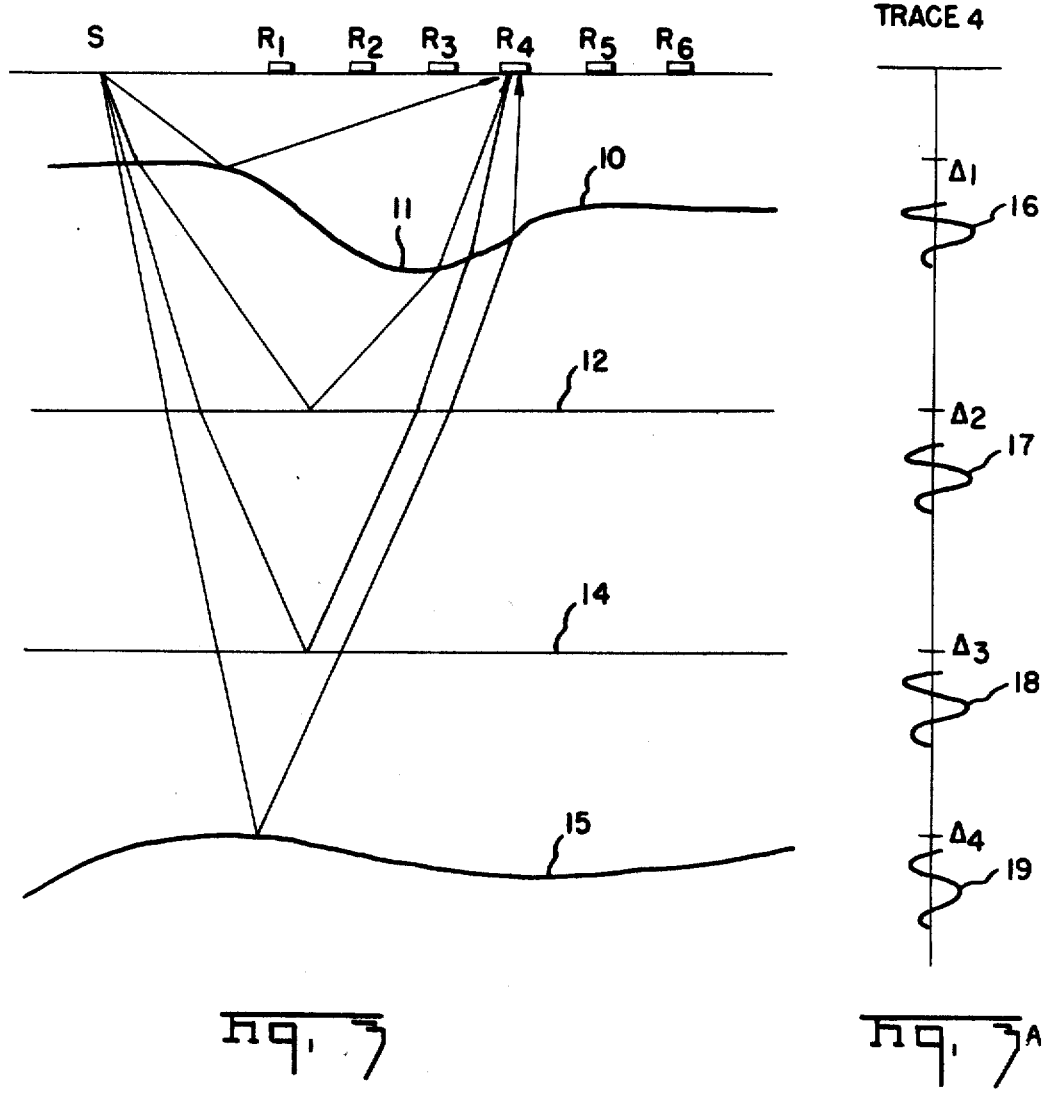
FIG. 7 depicts a velocity anomaly which produces distortion similar to the surface layer anomaly of FIG. 3.

While the invention has been described as applying to marine records, the invention is also applicable to land exploration. One anomalous situation to which the invention is applicable is shown in FIG. 7. In FIG. 7, the wedge 36 has a velocity $V_2$ which is different from the surface layer which has a velocity $V_1$. The subsurface layer has a velocity $V_3$ which is different from $V_1$ and $V_2$. Time errors resulting from this anomaly can be corrected in accordance with this invention. The depth section produced by the steps 22 and 23 of FIG. 1 is assigned a control layer without the anomaly and a velocity. Then, the time corrections are determined.

While a particular embodiment of the invention has been shown and described, various modifications are within the true spirit and scope of the invention. The appended claims cover all such modifications.

I claim:

1. In seismic exploration wherein seismic energy reflected from subsurface layers is detected to produce seismograms, the method of removing from the travel time of said seismograms the distortion caused by travel through a layer anomaly comprising:
   converting said travel time of said seismograms to a depth section of said layers including said anomaly;
   generating from said seismograms a depth section of said layers without said anomaly;
   converting the depth sections to reflection times for each subsurface layer with said anomaly and without said anomaly;
   generating time corrections from said reflection times for each trace of said seismograms for each subsurface; and
   time correcting said traces with said time corrections at the time of reflection from each of said subsurface layers.

2. The method recited in claim 1 wherein the step of converting said travel time to a depth section includes migrating said travel time to the correct depth and horizontal offset of the reflecting point.

3. The method recited in claim 1 wherein marine seismic exploration includes recording fathometer readings along said line of exploration; and using said fathometer readings to determine the travel time used in the step of converting travel time to a depth section.

4. The method recited in claim 1 wherein the step of generating a depth section without said anomaly includes:

manually assigning a control layer and a velocity to the layer including said anomaly; and generating a digital model of said surface layer without said anomaly.

5. The method recited in claim 1 wherein the step of generating time corrections includes determining the time difference between the reflection times of a subsurface with and without said anomaly; and storing a matrix of the time differences.

6. The method recited in claim 5 wherein the step of time correcting includes a time variant application of said time differences to the traces of said seismograms.

7. The method recited in claim 1 further comprising stacking the time corrected traces.

8. The method recited in claim 1 wherein the distortion removed by said method is introduced by a surface layer anomaly.

* * * * *